(12) United States Patent
Kanno et al.

(10) Patent No.: US 6,665,059 B2
(45) Date of Patent: Dec. 16, 2003

(54) METHOD OF MEASURING AN INNER STRESS STATE OF DISK SUBSTRATE

(75) Inventors: Toshiyuki Kanno, Kawasaki (JP); Eiji Ishibashi, Kawasaki (JP); Toru Yoshizawa, Koganei (JP); Yukitoshi Otani, Koganei (JP)

(73) Assignee: Fuji Electric Co., Ltd., Kanagawa (JP)

( * ) Notice: Subject to any disclaimer, the term of this patent is extended or adjusted under 35 U.S.C. 154(b) by 141 days.

(21) Appl. No.: 09/781,557

(22) Filed: Feb. 13, 2001

(65) Prior Publication Data

US 2001/0028451 A1 Oct. 11, 2001

(30) Foreign Application Priority Data

Feb. 14, 2000 (JP) ......................................... 2000-035820

(51) Int. Cl.⁷ .............................................. G01B 11/16
(52) U.S. Cl. .......................................... 356/33; 356/34
(58) Field of Search ..................... 356/32, 33, 364–368, 356/450, 453, 491; 250/225, 227.17, 252.1

(56) References Cited

U.S. PATENT DOCUMENTS 6,055,053 A * 4/2000 Lesniak ....................... 356/366
6,157,448 A * 12/2000 Kowa et al. ................ 356/365
6,473,179 B1 * 10/2002 Wang et al. ................. 356/364

FOREIGN PATENT DOCUMENTS

| JP | 07-020040 | 1/1995 |
| JP | 07-072013 | 3/1995 |
| JP | 07-229828 | 8/1995 |
| JP | 08-094444 | 4/1996 |
| JP | 10-267831 | 10/1998 |
| JP | 10-332533 | 12/1998 |

OTHER PUBLICATIONS

"Two Dimensional Birefringence Measurement Using the Phase Shifting Technique" Otani et al. Reprint from Optical Engineering May 1994, pp. 1604–1609.

"Two–Dimensional Birefringence Measurements by Using a Phase Shifting Technique" Otani et al., Department of Mechanical Systems Engineering, Tokyo University, Mar. 4, 1992, pp. 682(34)–687(39).

"Photoelastic Experimentation" published by Nikkan Kogyo Shinbun, 1965 issue, pp. 50–63.

* cited by examiner

*Primary Examiner*—Michael P. Stafira
(74) *Attorney, Agent, or Firm*—Venable LLP; Robert J. Frank; Catherine M. Voorhees

(57) ABSTRACT

A measuring method capable of automatically analyzing quantitatively the inner state of a disk is provided. Linearly polarized light from a light source enters a retarder to produce a desired elliptically polarized state. The elliptically polarized light is then passed through a half-wave plate to rotate the direction of a principal axis of the ellipse. The light is expanded into two dimensions by lens systems and to obtain planar information, and is further transmitted through a disk substrate so that the birefringence of a specimen, which depends on an inner stress state and a polymer orientation state, changes the phase of the light. The light wave with its phase changed is passed through a polarizer arranged perpendicular to the principal axis of the retarder. The CCD detects the light wave as a light intensity.

9 Claims, 6 Drawing Sheets

METHOD OF MEASURING AN INNER STRESS STATE OF DISK SUBSTRATE

This application is based on Patent Application No. 2000-35820 filed Feb. 14, 2000 in Japan, the content of which is incorporated hereinto by reference.

BACKGROUND OF THE INVENTION

1. Field of the Invention

The present invention relates to a method of measuring an inner stress state of a disk substrate and more specifically to a disk substrate's inner stress state measuring method that can quantify with high precision a distribution of an inner state, such as stress and strain and flow orientation in a disk substrate material being microprocessed, visualize it multi-dimensionally and implement an appropriate quality control of the disk substrate.

2. Description of the Related Art

As there are growing demands on disks for higher density, lower cost and higher durability, the disk substrates are being required to have a higher quality. The rapid trend toward information society intensifies these demands for higher density, lower cost and higher durability. In optical disks in particular, the substrates of which are made mainly from plastics, the track width has been on the decrease for higher density and thus microfabrication substrates without distortion are being called for. In magnetic disks, too, there is a similar trend. It has been common practice that when recording data in a recording medium using an aluminum or glass substrate, position signals are written at the same time by a servo writer that records servo marks. In this way, address information is given for the magnetic head to track the recorded track.

This method, however, has a technical problem in enhancing the position accuracy. To deal with this situation, a method has been proposed which forms depressed or raised servo marks on the disk substrate by using the film deposition technology. At the same time there is a trend for making the substrate by molding plastic materials, such as thermoplastic polymers, for reduced weight and cost.

Fabrication of substrates by molding is advantageous in terms of cost because of its high productivity. As to the magnetic medium, however, because the magnetic head is in contact with the magnetic medium, as opposed to the optical disk which is kept out of contact with the head, and because the space between the magnetic head and the magnetic medium is only a few tens of nanometers, the substrate must have no warping, deformation or degraded durability. It is therefore important for improved performance, the prevention of performance deterioration and quality control to determine the inner state of the substrate, such as stress and strain and flow orientation, during the molding of the substrate.

As a means to that end, various methods have been proposed, which include a method of observing birefringence qualitatively using the conventional photoelasticity method ("Photoelastic Experimentation" Published by Nikkankogyo Shimbun, a 1965 issue), an ellipsometer method as disclosed in Japanese Patent Laid-open No. 7-72013 (1995), a point measurement method as disclosed in Japanese Patent Laid-open Nos. 7-20040 (1995), 7-229828 (1995) and 10-267831 (1998), and a microscopic observation method as disclosed in Japanese Patent Laid-open No. 8-94444 (1996).

In the point measurement method, the measurement of distributions in the substrate takes time. In a method disclosed in Japanese Patent Laid-open No. 10-332533 (1998), although it can evaluate the birefringence distribution, this method has a problem in terms of precision when observing the inner state of the substrate because it observes the polarized light by using a color plate method. It is therefore necessary to automatically analyze the inner state (stress/strain and flow orientation, etc.) of the disk substrate.

Under these circumstances, the inventors of this invention conducted research and proposed a "Two-dimensional birefringence distribution measurement based on the phase shifting technique" ("OPTICS" October 1992, Vol. 21, No. 10, pp. 682 (34)-687 (39)) and a "Two-dimensional birefringence measurement using the phase shifting technique" ("OPTICAL ENGINEERING" May 1994, Vol. 33, No. 5, pp. 1604–1609). According to the result of experiments conducted by using the basic principle for obtaining two-dimensional distribution of the birefringence, the present invention has made improvements and optimization especially on the method of measuring the inner stress state in the disk substrate.

In the molded disk substrate, a birefringence of the material itself and a birefringence phase difference caused by stress and strain developed in the material during the molding process induce a variety of problems in the way of manufacturing high precision substrates. Hence, there are growing demands for a measurement method that can measure quantitatively with high precision the inner stress state of the substrate and the distribution of the flow orientation during the molding of the substrate, and which can also perform quality control based on an automatic measurement.

SUMMARY OF THE INVENTION

The present invention has been accomplished to overcome the aforementioned drawbacks and provide a method of measuring an inner stress state in a disk substrate which can automatically analyze quantitatively the inner state of the disk substrate, i.e., stress-induced strains and a flow orientation state.

To achieve the above objective, the present invention according to a first aspect provides a measuring method which comprises the steps of: throwing a light wave onto a molded disk substrate, the light wave being produced by giving a phase difference to a principal axis of a linearly polarized light from a light source; image-processing a birefringent phase difference and a change in a principal axis direction according to an amount of change in polarization produced inside the disk substrate by the birefringence; and measuring multi-dimensionally an in-plane distribution of birefringence, such as an inner stress-induced strains in the molded disk substrate and a flow state of a resin being molded, using a phase shifting technique.

According to a second aspect, the invention provides a measuring method according to the first aspect, which includes: a retarder made from a liquid crystal element or electro-optic element to give a phase difference to the principal axis of the linearly polarized light emitted from the light source; a half-wave plate for rotating the principal axis direction of an elliptically polarized light; and a polarizer arranged in a direction perpendicular to the principal axis direction of the light wave rotated by the half-wave plate; wherein the elliptically polarized light is expanded into two dimensions by a lens system to produce image information and is thrown onto the disk substrate to detect an amount of change in the phase difference of an intensity of the transmitted light and motor-drive the half-wave plate and the polarizer, thus enabling an automatic measurement.

According to a third aspect, the invention provides a measuring method according to the first or second aspect, in which an electro-optic element is provided as a rotary polarizer for rotating the principal axis direction of the elliptically polarized light emitted from the retarder and the polarizer is fixed to detect the amount of change in the phase difference of an intensity of the transmitted light.

According to a fourth aspect, the invention provides a measuring method according to the first, second or third aspect, in which an optical lens is provided behind the polarizer to provide magnified or local viewing.

With the above construction, it is possible to automatically measure visually, quanitatively and with high precision the information on the internal state of the substrate, such as distribution of stress-induced strains and a flow orientation state, which develops inside the disk substrate during molding of a material or during microfabrication. This in turn allows for the quality control of substrates. Because optimum material and optimum molding conditions can be obtained, the measuring method of this invention is suited for producing high performance disk substrates.

The above and other objects, features and advantages of the present invention will become more apparent from the following description of embodiments thereof taken in conjunction with the accompanying drawings.

DESCRIPTION OF THE PREFERRED EMBODIMENTS

Now, embodiments of this invention will be described by referring to the accompanying drawings.

Figure 1:
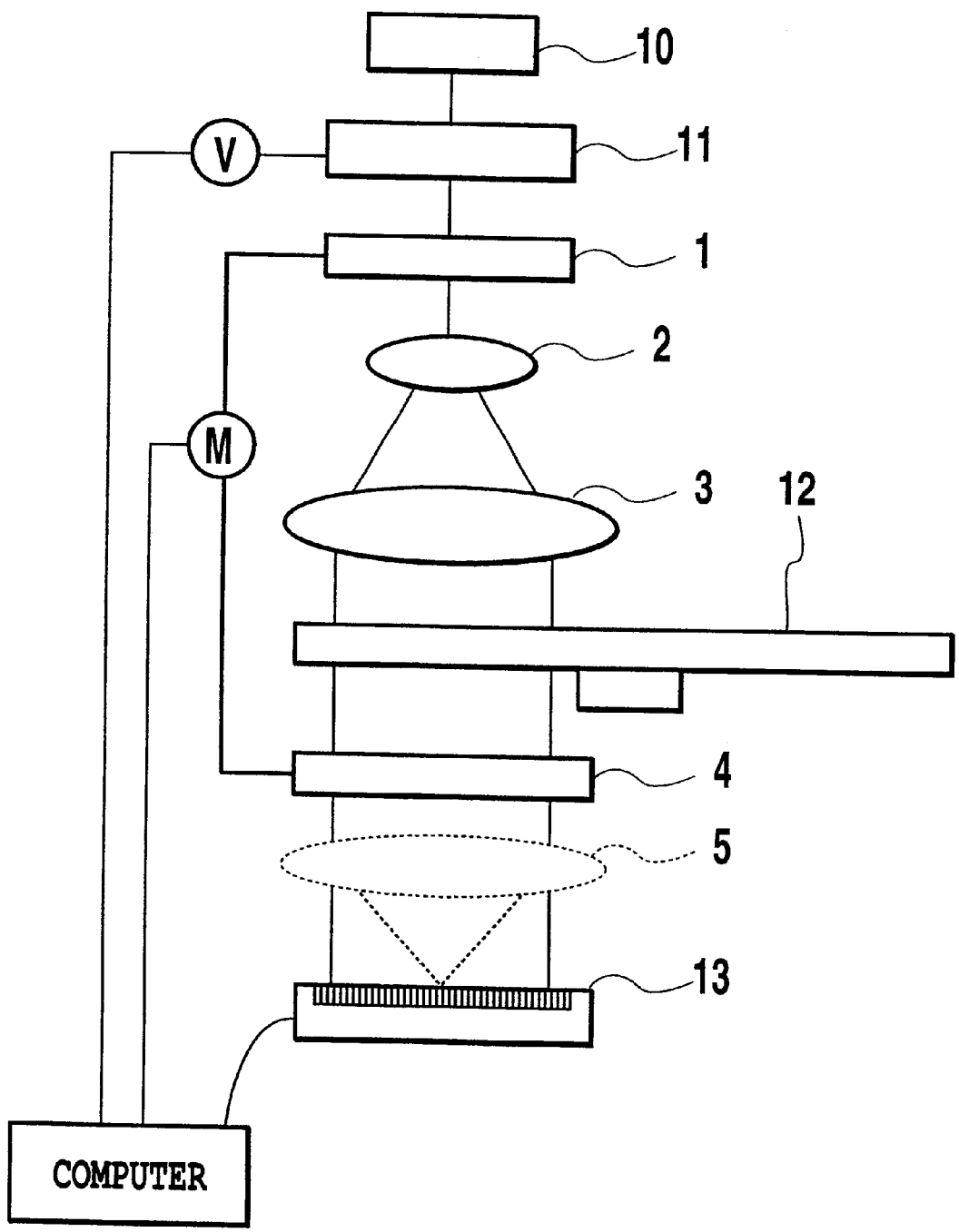
FIG. 1 is a schematic diagram showing one embodiment of the method for measuring the inner stress state of a disk substrate according to this invention.

FIG. 1 shows an example method of measuring the inner stress state in the disk substrate according to this invention. In the optical system shown in FIG. 1, the phase shifting technique is performed two times to measure the inner stress state and the polymer's orientation state in the form of a single two-dimensional birefringence distribution.

Linearly polarized light from a light source 10 enters a retarder 11 to produce a desired elliptically polarized state. The elliptically polarized light is then passed through a half-wave plate 1 to rotate the direction of a principal axis of the ellipse. Then, the light is expanded into two dimensions by lens systems 2 and 3 to obtain planar information, and is further transmitted through a disk substrate 12 so that the birefringence of a specimen, which depends on an inner stress state and a polymer orientation state, changes the phase of the light. The light wave with its phase changed is further passed through a polarizer 4 arranged perpendicular to the principal axis of the retarder 11 and is then focused on a CCD 13 by a lens system 5 for magnified or local viewing according the purpose. The CCD detects the light wave as a light intensity.

In conventional methods, the Babinet-Soleil compensator was used as the retarder and the directions of the principal axes of the half-wave plate and the polarizer were rotated manually as the development level was still in the laboratory stage. In this invention, improvements and optimizations have been made to enable high-speed measurement for practical use.

In the embodiment shown in FIG. 1, a liquid crystal phase modulator that enables electrical control of an arbitrary phase difference is used for the retarder 11. The adjustment of the principal axis direction of the half-wave plate and the polarizer is automated by using a stage driven by a dedicated motor.

Figure 2:
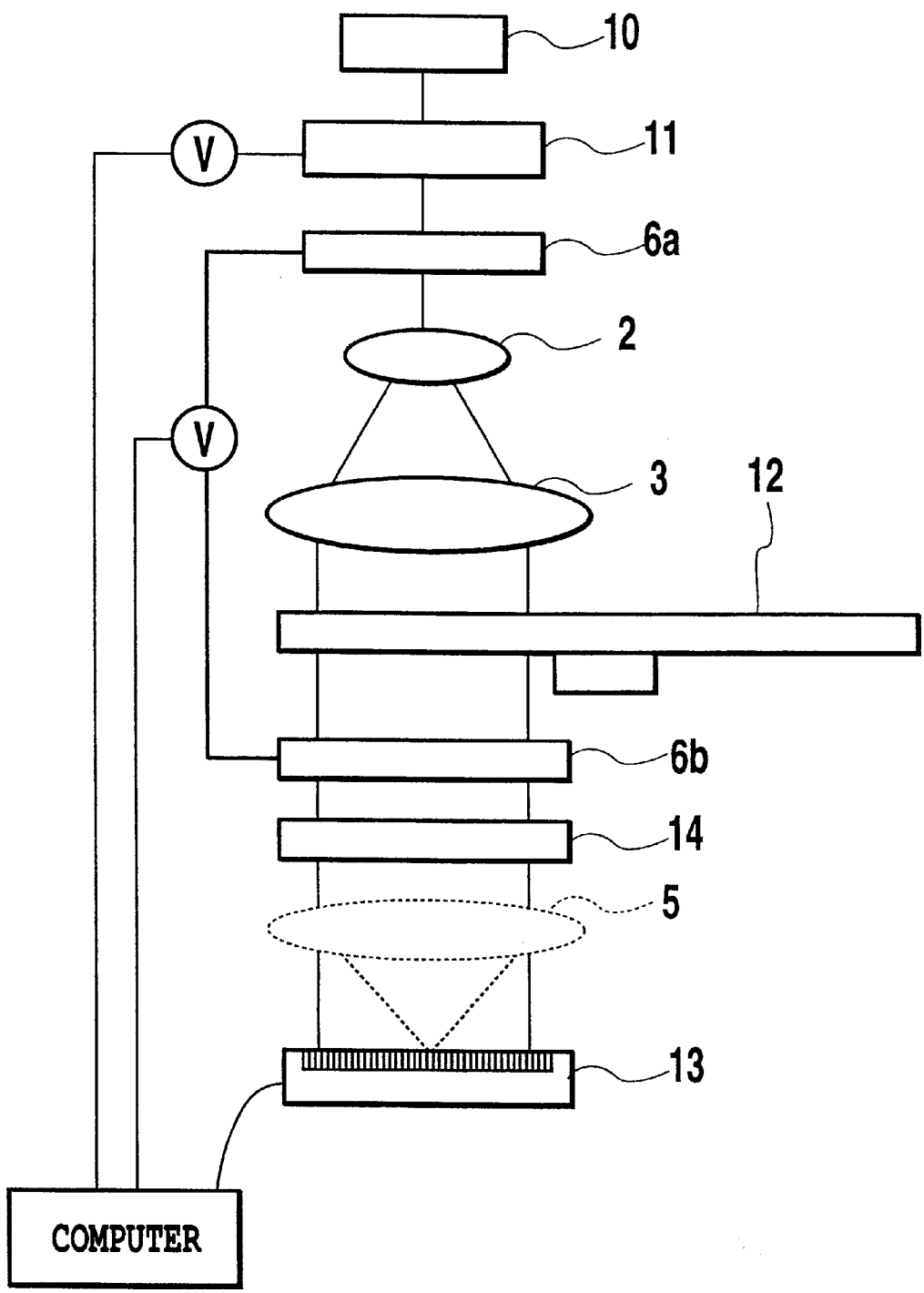
FIG. 2 is a schematic diagram showing another embodiment of the method for measuring the inner stress state of a disk substrate according to this invention.

FIG. 2 shows another embodiment of the method of measuring an inner stress state of the disk substrate according to this invention. This method performs the phase shifting technique two times using an optical system shown in FIG. 2 to measure the inner stress state and the polymer orientation state in the form of a single two-dimensional birefringence distribution as in the embodiment of FIG. 1.

The linearly polarized light from the light source 10 enters the retarder 11 to produce a desired elliptically polarized state. The elliptically polarized light is then passed through a Faraday rotator or electro-optic modulation element (EO element) 6a which, as a rotary modulator for rotating the principal axis direction of an ellipse, produces an optical change by voltage. Then, the light is expanded into two dimensions by lens systems 2 and 3 to obtain planar information, and is further transmitted through a disk substrate 12 so that the birefringence of a specimen, which depends on an inner stress state and a polymer orientation state, changes the phase of the light. The light wave with its phase changed is further passed through another set of rotary polarizer, i.e., a Faraday rotator or electro-optic modulation element (EO element) 6b, which changes the principal axis direction of the elliptically polarized light with respect to a polarizer 14 whose principal axis is held perpendicular at all times to the principal axis of the retarder 11. After passing through the polarizer 14, the light wave is focused by a lens system 5 onto the CCD 13 where it is detected as a light intensity.

In this way, with the system controlled by a dedicated computer, simply setting the disk substrate on the stage initiates an automatic measurement of a birefringence distribution, thus allowing the inner stress state and polymer orientation to be determined.

Actual analysis is conducted as follows. Let $\delta$ stand for a phase difference of the retarder, $\theta$ for an azimuth angle of the principal axis of the elliptically polarized light when the principal axis direction is rotated by the half-wave plate or EO element, $\phi$ for a principal axis direction of the disk substrate, and $\Delta$ for a birefringent phase difference ($\Delta \ll 1$). The principal axis direction of the polarizer is rotated to change its azimuth angle $\theta$. The relation among these parameters can, according to the "Optics" published by the inventors in October 1992, be calculated using the Mueller matrices as the Stokes parameters. The finally obtained intensity I of an interference fringe is expressed as follows, with $I_0$ representing the intensity of incident light.

$$I = \frac{1}{2}[1 - \cos\{\tan^{-1}(\Delta\cos(2\theta - 2\phi) + \delta\}]I_0 \quad (1)$$

For the detection of the birefringent phase difference Δ and the principal axis direction φ, a two-step phase shifting technique is used. First, θ is set to 0° and the phase Φ is determined by giving a phase change δ by the retarder as a phase shifter. From the light intensity obtained by changing the known quantity δ in steps of 90° by the retarder, the phase shifting technique is used to obtain Φ as follows.

$$\Delta \cdot \cos(2\theta - 2\phi) = \frac{I_1 - I_3}{I_0 - I_2} = \Phi \quad (2)$$

Next, as the azimuth angle θ of the principal axis direction of the elliptically polarized light makes one complete turn, the phase Φ changes 2 periods sinusoidally, so that by performing the phase shifting in accordance with the rotation of θ it is possible to determine the birefringence principal axis direction φ and the birefringence phase difference Δ. According to the four-step method, the birefringent phase difference Δ and principal axis direction φ can be determined as follows by using the phases Φ corresponding to the four different rotation angles when the retarder and the polarizer are changed θ at a time.

$$\phi = \frac{1}{2}\tan^{-1}\frac{\Phi_1 - \Phi_3}{\Phi_0 - \Phi_2} \quad (3)$$

$$\Delta = \frac{1}{2}\sqrt{(\Phi_2 - \Phi_0)^2 + (\Phi_3 - \Phi_1)^2} \quad (4)$$

As described above, by using the 4-step phase shifting technique, the principal axis direction and the birefringent phase difference are determined using a total of 16 images. The precision and the limit of measurement of this method was examined by the calibrated Babinet-Soleil compensator. It is found that the birefringent phase difference and principal axis direction are both measured to within ±1° and the quantitative measurement can be made within 1 minute with high accuracy. Thus this method has proved to be an effective measuring means. Now that the distribution of the inner stress state of the molded disk substrate and of the flow orientation state during molding can automatically be measured quantitatively with high precision, the present invention is complete.

The measured data obtained by this method of this invention will be detailed in the following. The molding machine used for molding the substrates to be measured is a commercially available molding apparatus with a maximum ejection pressure of 70 t.

(Measurement 1)

A mold used was provided with a stamper, and for a resin with little water absorbability a highly heat-resistant cyclic olefin-based resin was used. Magnetic disk substrates 95 mm in diameter by 1.27 mm in thickness were molded under the following conditions: resin temperature of 350° C., ejection speed of 170 mm/s, clamping pressure of 70 kg/cm², and mold temperature of 130° C. on the stationary side and 125° C. on the movable side.

(Measurement 2)

The substrates thus formed were subjected to six hours with temperature of 100° C. of annealing processing.

(Measurement 3)

The same stamper was used, and cycloolefin-based resin, a resin with little water absorbability similar to that used in the Measurement 1 was used. Magnetic disk substrates were molded under the conditions: resin temperature of 330° C., ejection speed of 120 mm/s, clamping pressure of 70 kg/cm², and mold temperature of 110° C. on the stationary side and 100° C. on the movable side.

Figure 3:
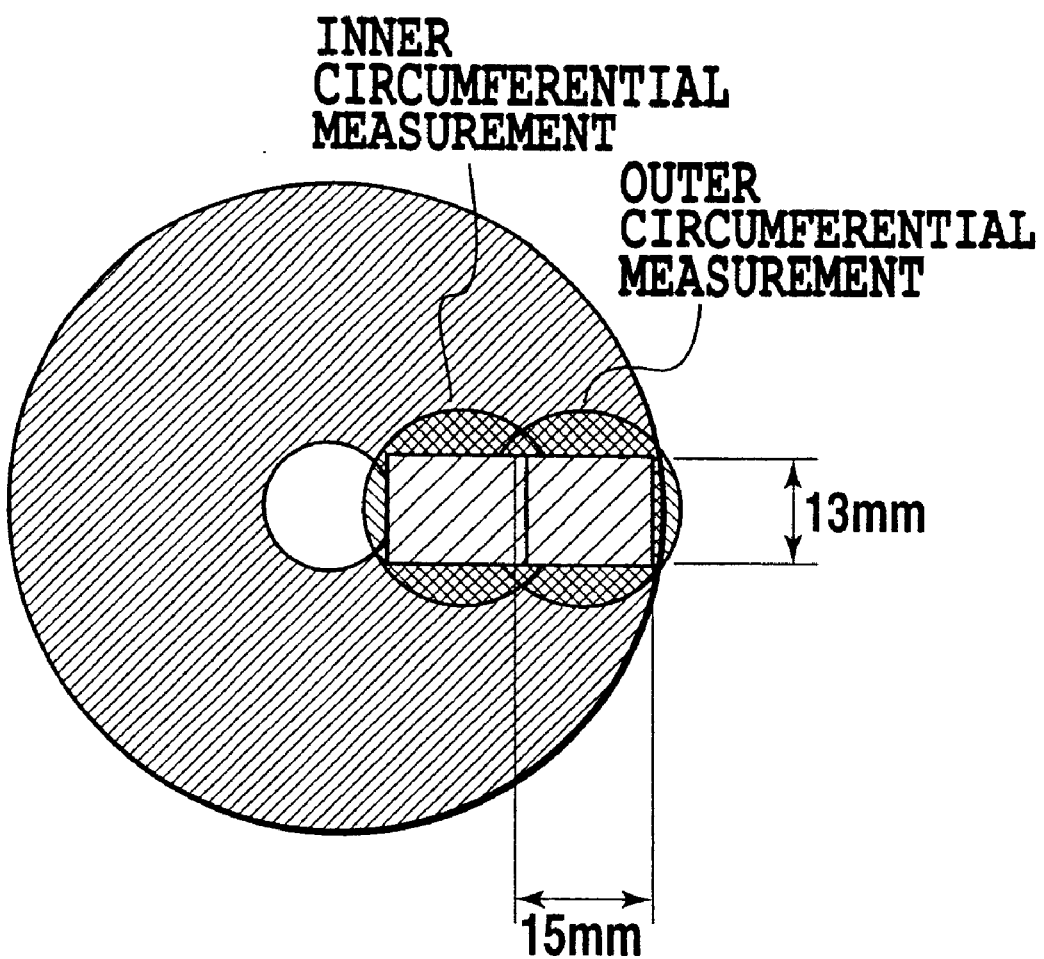
FIG. 3 is a view showing observation positions on the substrate.
Figure 4:
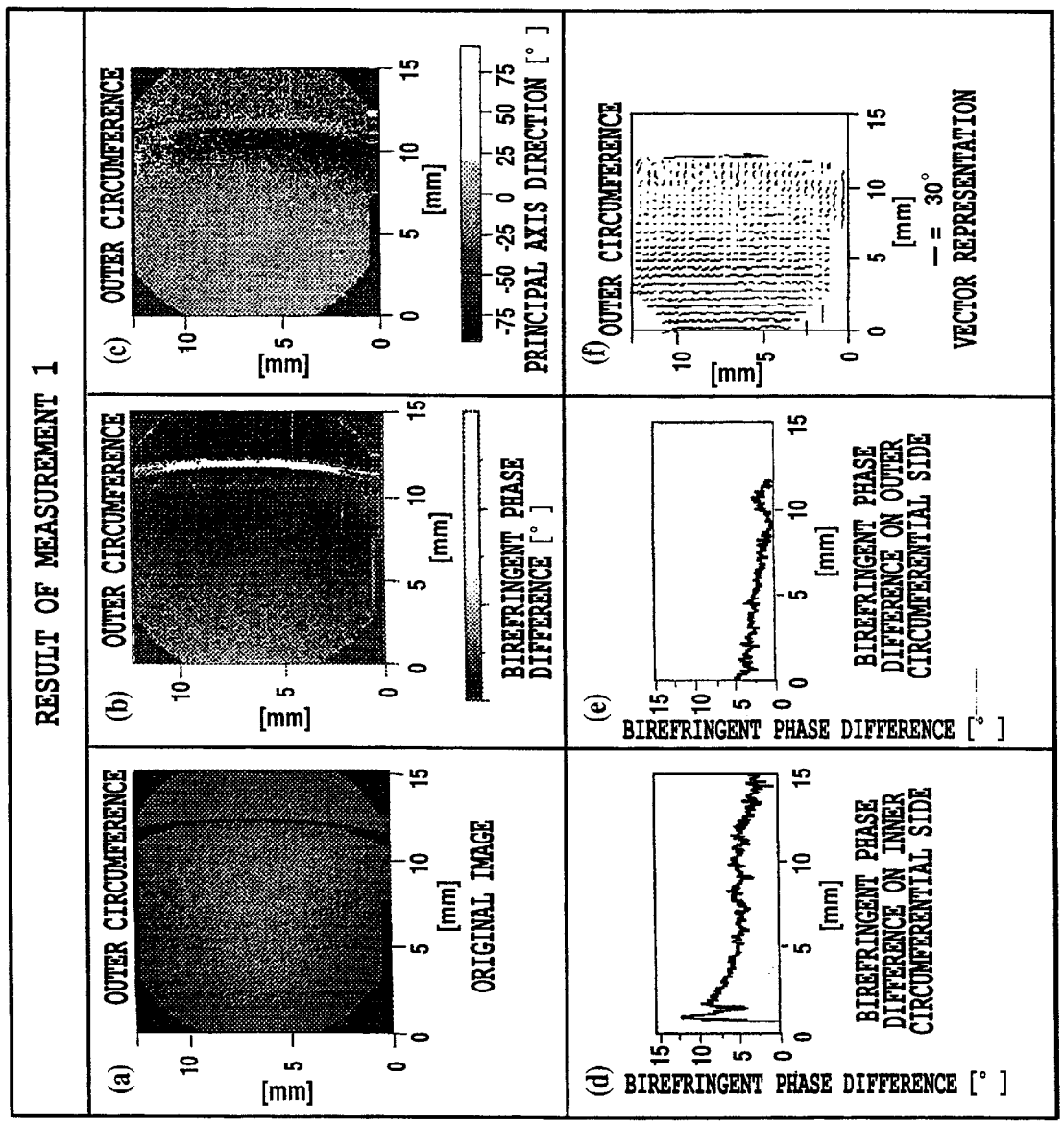
FIG. 4 is a diagram showing results of a measurement case 1.
Figure 5:
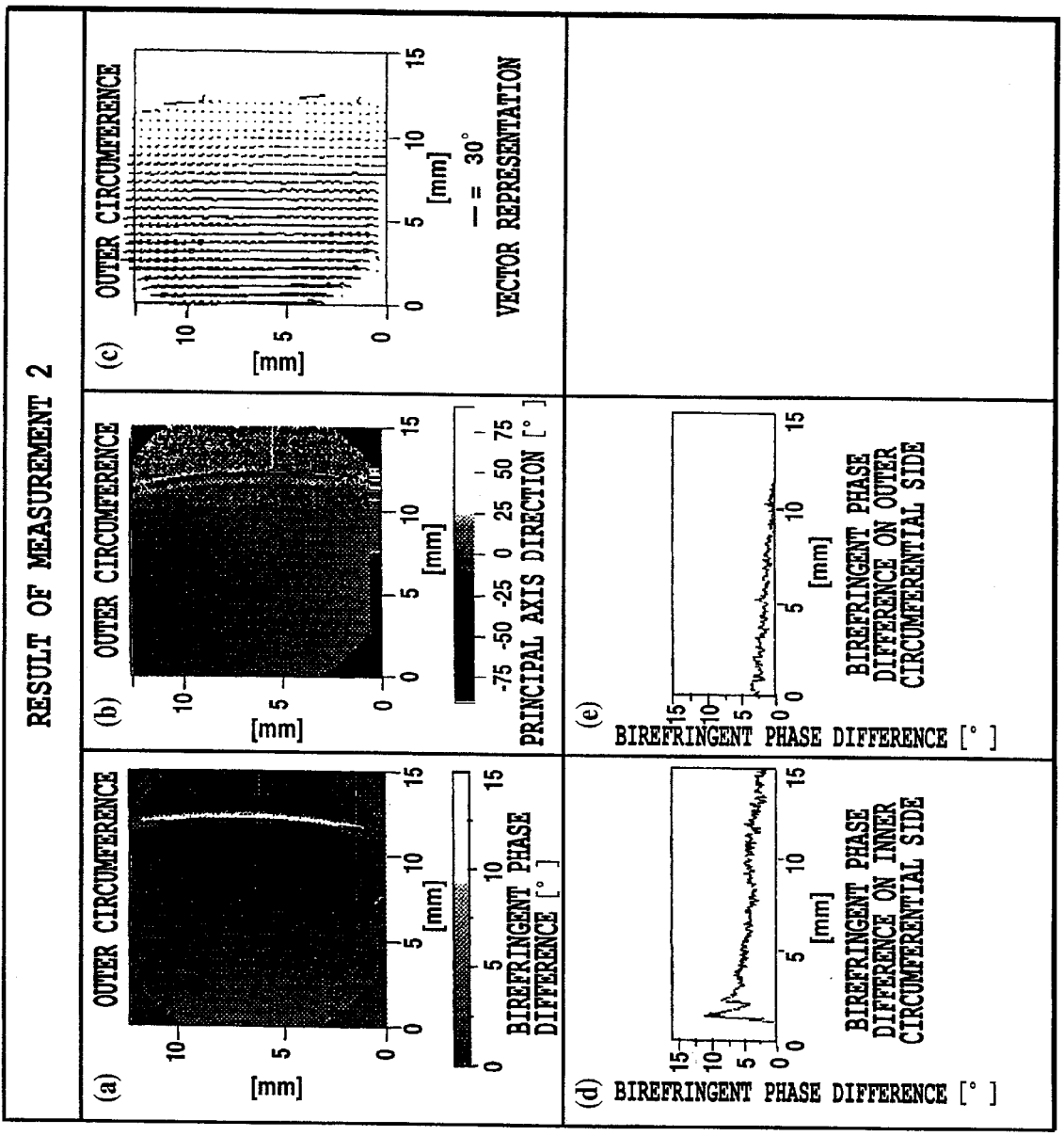
FIG. 5 is a diagram showing results of a measurement case 2.
Figure 6:
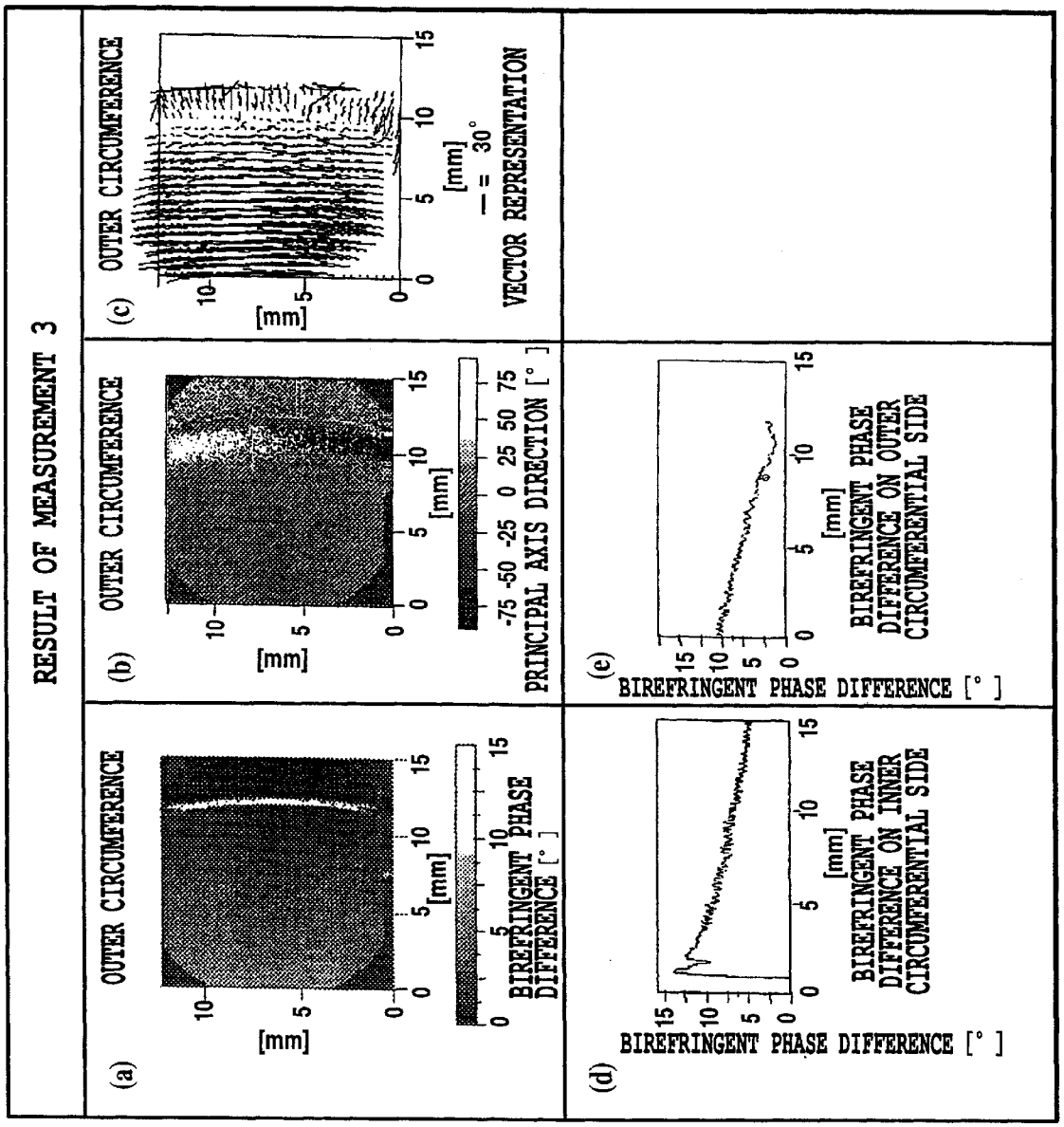
FIG. 6 is a diagram showing results of a measurement case 3.

FIG. 3 shows two observation positions, one along the inner circumference and the other along the outer circumference, at which the substrate is observed according to the method of this invention, with "a" representing the inner circumferential measurement and "b" representing the outer circumferential measurement. FIGS. 4 to 6 show the results of the outer circumferential measurements and the distribution of the birefringent phase difference in the radial direction.

FIG. 4(a) showing the result of the Measurement 1 is an original image of the phase difference of an interference fringe obtained by the CCD during measurement in which an interference fringe is seen about 5 mm from the outer circumference. The birefringent phase difference in FIG. 4(b) is small, but it is seen that the substrate has an uneven stress-induced strains in the circumferential direction. FIG. 4(c) shows that the birefringent principal axis direction has changed further. The vector diagram of FIG. 4(f) shows a change in the flow orientation state and a flow direction.

As for the birefringent phase difference distribution in the radial direction (cross section) of the substrate, FIGS. 4(d) and (e) show that the phase difference decreases from the inner circumference toward the outer circumference and that there is a broad peak about 10 mm from the inner circumference. This peak is assumed to be a flow mark produced during molding. A birefringent peak is observed at the outer circumference due to a change in the orientation state.

From FIG. 5 showing the result of Measurement 2 it is seen that the inner stress/strain state is generally improved by the so-called anneal processing. Further, from FIG. 6 showing the result of Measurement 3, it is seen that although the resin differs, there is a similar tendency to that of FIG. 4 and that the birefringent phase difference in the radial direction is generally distributed at high level.

The foregoing description shows that the measurement method of this invention can automatically analyze quickly, accurately, quantitatively and two-dimensionally large amounts of information including the inner stress state and the material flow orientation state in the molded disk substrate.

Further, the substrate was deposited with multiple layers of recording film (base layer, magnetic layer and protective layer) and also with a lubrication layer over these layers to form a magnetic disk medium. The shape evaluation was made of the substrate and the medium respectively. The examination using a flatness tester (Flatness Tester FT-12 of NIDEK Co., Ltd. make) finds that both the substrate and the medium used in the Measurement 2 exhibited the best result followed by Measurement 1, and followed by Measurement 3. The medium was tested by using an MR head in a CSS tester (of Lotus make). It was found that only the substrate of Measurement 2 was able to withstand the use, with the substrates of Measurement 1 and 3 crashed.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A method of measuring an inner stress state in a disk substrates comprising the steps of:

projecting a light wave onto a molded disk substrate, the light wave being produced by giving a phase difference to a principal axis of a linearly polarized light from a light source;

image-processing a birefringent phase difference and a change in a principal axis direction according to an amount of change in polarization produced inside the disk substrate by the birefringence; and measuring multi-dimensionally an in-plane distribution of birefringence by using a phase shifting technique, said in-plane distribution of birefringence being an inner stress-induced strains in the molded disk substrate and a flow orientation state of a resin being molded.

2. A method of measuring an inner stress state in a disk substrate according to claim 1, further comprising the steps of:

providing a retarder made from a liquid crystal element or electro-optic element to give a phase difference to the principal axis of the linearly polarized light emitted from the light source;

providing a half-wave plate for rotating the principal axis direction of an elliptically polarized light; and providing a polarizer arranged in a direction perpendicular to the principal axis direction of the light wave rotated by the half-wave plate;

wherein the elliptically polarized light is expanded into two dimensions by a lens system to produce image information and is projected onto the disk substrate to detect an amount of change in the phase difference of an intensity of the transmitted light and motor-drive the half-wave plate and the polarizer thus thereby enabling an automatic measurement.

3. A method of measuring an inner stress state in a disk substrate according to claim 2, wherein an electro-optic element is provided as a rotary polarizer for rotating the principal axis direction of the elliptically polarized light emitted from the retarder and the polarizer is fixed to detect the amount of change in the phase difference of an intensity of the transmitted light.

4. A method of measuring an inner stress state in a disk substrate according to claim 3, wherein an optical lens is provided behind the polarizer to provide magnified or local viewing.

5. A method of measuring an inner stress state in a disk substrate according to claim 2, wherein an optical lens is provided behind the polarizer to provide magnified or local viewing.

6. A method of measuring an inner stress state in an disk substrate according to claim 1, wherein an optical lens is provided behind the polarizer to provide magnified or local viewing.

7. A method of measuring an inner stress state in a disk substrate, comprising the steps of:

projecting a light wave onto a molded disk substrate, the light wave being produced by giving a phase difference to a principal axis of a linearly polarized light from a light source;

image-processing a birefringent phase difference and a change in a principal axis direction according to an amount of change in polarization produced inside the disk substrate by the birefringence; and measuring multi-dimensionally an in-plane distribution of birefringence by using a phase shifting technique, said in-plane distribution of birefringence being an inner stress-induced strains in the molded disk substrate and a flow orientation state of a resin being molded;

providing a retarder made from a liquid crystal element or electro-optic element to give a phase difference to the principal axis of the linearly polarized light emitted from the light source;

providing a half-wave plate for rotating the principal axis direction of an elliptically polarized light; and providing a polarizer arranged in a direction perpendicular to the principal axis direction of the light wave rotated by the half-wave plate;

wherein the elliptically polarized light is expanded into two dimensions by a lens system to produce image information and is projected onto the disk substrate to detect an amount of change in the phase difference of an intensity of the transmitted light and motor-drive the half-wave plate and the polarizer thereby enabling an automatic measurement.

8. A method of measuring an inner stress state in a disk substrate according to claim 7, wherein an electro-optic element is provided as a rotary polarizer for rotating the principal axis direction of the elliptically polarized light emitted from the retarder and the polarizer is fixed to detect the amount of change in the phase difference of an intensity of the transmitted light.

9. A method of measuring an inner stress state in a disk substrate according to claim 8, wherein an optical lens is provided behind the polarizer to provide magnified or local viewing.

* * * * *